United States Patent Office 3,338,862
Patented Aug. 29, 1967

---

3,338,862
OIL RESISTANT NITRILE RUBBERS AND RUBBER CEMENTS PREPARED THEREFROM
John C. Baker, Jr., Dover, Del., assignor to International Latex & Chemical Corporation, Dover, Del., a corporation of Delaware
No Drawing. Filed Dec. 3, 1965, Ser. No. 511,342
9 Claims. (Cl. 260—33.6)

The present invention relates to synthetic elastomers of the butadiene-acrylonitrile type having improved characteristics for use in solvent solutions, such as rubber cements and the like. More particularly, the invention pertains to rubbery multipolymers having as their essential constituents a conjugated diolefin, an aliphatic nitrile, and an alkenyl aromatic monomer in certain monomer proportions and to rubber cements of the same.

This application is a continuation-in-part application of copending application Ser. No. 277,140 filed May 1, 1963, now abandoned.

The multipolymers of the invention when properly polymerized from aqueous emulsions of the essential monomers possess the advantageous property of high solubility in relatively inexpensive aromatic hydrocarbon solvents, such as toluene. This property is obtained while retaining in the cured rubber oil resistance and other physical properties characteristic of vulcanized butadiene and acrylonitrile copolymers devoid of any alkenyl aromatic monomer constituent.

For many applications of rubber cement, it is desirable for the rubber after curing to exhibit a high degree of resistance to substances of mineral origin such as oils, fuels, greases, and other petroleum products, and also oils of vegetable origin, which are predominantly of aliphatic hydrocarbon content. For example, in cementing of gaskets, and making other cemented joints or laminates which are exposed to the above-mentioned substances, the rubber of the cement after curing must be substantially impervious to attack, i.e., it must exhibit at most only limited swelling.

Rubbery copolymers of butadiene and acrylonitrile are well recognized as providing the oil resistance desired for such rubber cement applications. However, copolymers of butadiene and acrylonitrile exhibit poor solubility in aromatic hydrocarbons even when butadiene is the predominant monomer. Therefore, in order to provide nitrile rubber cements having the proper viscosity and "flow out" properties for working, it is generally necessary to use relatively expensive solvents, for example, methyl ethyl ketone. There exists a need for rubbery copolymers of the aliphatic nitrile-butadiene (NBR) type which exhibit relatively high solubility in less expensive solvents of the aromatic hydrocarbon type, such as benzene and toluene, and which at the same retain the oil resistance characteristics of conventional butadiene-acrylonitrile copolymers.

I have discovered that multipolymers of conjugated diolefins, such as butadiene, aliphatic nitriles, such as acrylonitrile, and alkenyl aromatic monomers, such as styrene, prepared by aqueous emulsion copolymerization of certain proportions of these monomers provide this desired result. Toluene solutions of the uncured copolymers exhibit much lower viscosities than toluene solutions of conventional butadiene-acrylonitrile rubber. At the same time the cured rubbery copolymers of the invention deposited from such solutions exhibit oil resistance and other physical properties comparable to butadiene-acrylonitrile copolymers devoid of the aromatic monomer. Thus, the invention provides rubber cements made with relatively inexpensive aromatic hydrocarbon solvents which are fluid and easily spread at dissolved rubber concentrations which produce only unworkably thick semi-solid or gelatinous mixtures with butadiene-acrylonitrile copolymers devoid of the aromatic monomer.

In general, the copolymers of the invention are multipolymers prepared by copolymerization of from 40% to 70% of a conjugated diolefin, 20% to 40% of a copolymerizable aliphatic nitrile and 10% to 40% of a copolymerizable alkenyl aromatic monomer, the polymerization preferably being carried out in aqueous emulsion. The copolymers are prepared in a gel free state by copolymerizing the monomers to a degree of conversion below the gel point for the particular copolymer in a modifier-containing polymerization system. For example, with butadiene-acrylonitrile-styrene terpolymers the conversion should not substantially exceed about 80% in a system containing from about 0.25 to about 0.75 part of a modifier per 100 parts of monomers charged. These gel free copolymers are totally soluble in aromatic hydrocarbon solvents and form solutions of low viscosity and good flow properties which make them suitable for rubber cements.

The term "modifier" as used herein refers to those compounds commonly recognized in the synthetic rubber industry as chain transfer agents, e.g., alkyl mercaptans, which provide control of the molecular weight, of cross-linking and other advantages effects on the polymer chain undergoing polymerization. In general, use of modifiers serves to promote production of shorter and lower molecular weight polymers which are softer and more easy to process than those polymers produced without the modifiers.

The copolymers of the invention and their application in rubber cements are described in greater detail in the following examples which provide complete specific embodiments of the invention sufficient to permit those skilled in the art to practice the same, it being understood that the invention is not to be regarded as limited to these specific illustrations.

*Example I*

To 150 parts of water in a suitable reaction vessel were added 3 parts of potassium oleate as emulsifying agent, 0.04 part of a chelating agent ethylenediamine tetraacetic acid, Sequestrene AA, 0.25 part of a sodium salt of polymerized alkyl aryl sulfonic acid (Darvan #1) as dispersing agent, 0.03 part of potassium persulfate as polymerization initiator, and 0.50 part of tertiary dodecyl mercaptan as modifier. 30 parts acrylonitrile and 20 parts of styrene were added to the water containing the above-mentioned recipe ingredients. After purging the vessel of air, 50 parts of butadiene were added and polymerization was conducted at 50° C. with agitation.

0.50 part of hydroxyl ammonium sulfate (5% solution) was added to shortstop the reaction at 70.6% conversion. The latex at 38.2% solids was coagulated by addition of a 5% NaCl solution with a pH of 4 (HCl), and the precipitate was water washed and dried at 150° F.

A 20 gram sample of the dried rubbery copolymer was dissolved in 100 grams of toluene and the viscosity of the resulting fluid solution measured 45 seconds by the Zahn cup measurement (#3 cup). In comparison, a mixture of 20 grams of a commercial rubbery copolymer of 67–68% butadiene and 32–33% acrylonitrile in 100 grams of toluene gave a thick gelatinous mass so viscous that no reading was obtainable with a #3 Zahn cup.

*Example II*

The following examples given in Table I below illustrate the wide variation permissible in the nature of the alkenyl aromatic monomer and the monomer proportions, while obtaining the desired results of the invention. The polymerization of these copolymers was conducted in recipes similiar to that of Example I at 50–55° C. and the reactions were short-stopped at the indicated conversions.

are comparable to those of commercial butadiene-nitrile (NBR) rubbers as shown in Table II below. In particular the oil resistance of the terpolymers of the invention is comparable to that of the NBR rubbers even though the terploymers are readily soluble in aromatic hydrocarbon solvents.

Samples of the copolymers of the invention and the commercial butadiene-acrylonitrile rubbers were vulcanized with the following cure recipe and their properties are set forth in Table II. Sample numbers correspond to those given in Table I and are for the same polymers:

|  | Parts |
| --- | --- |
| Rubber | 100.00 |
| SRF black (Furnex) | 40.00 |
| Dibutyl phthalate | 5.00 |
| Sulfur | 1.50 |
| Zinc oxide | 3.00 |
| Stearic acid | 1.00 |
| Benzothiazyl disulfide (Altax) | 1.00 |
|  | 151.50 |

TABLE I

|  | Sample No. | | | | | | |
| --- | --- | --- | --- | --- | --- | --- | --- |
|  | 1 | 2 | 3 | 4 | 5 | [1] 6 | [1] 7 |
| Parts of Monomer Charged: | | | | | | | |
| Butadiene | 50 | 60 | 50 | 60 | 60 | 66 | 66 |
| Acrylonitrile | 30 | 30 | 30 | 30 | 20 | 34 | 34 |
| Stryene | | | 20 | 10 | | | |
| Vinyl Pyrrolidone | 20 | 10 | | | 20 | | |
| Percent Conversion | 65 | 70.3 | 72.0 | 72 | 69.5 | | |
| Percent Total Solids | 34.6 | 41.0 | 40.5 | 47.8 | 48.4 | | |
| Viscosity, seconds (#3 Zahn cup) | 55 | 48 | 69 | 67 | 45 | 210 | [2] |

[1] Commercial butadiene, acrylonitrile copolymer rubber.
[2] Too thick, no reading.

TABLE II.—CURED RUBBER PROPERTIES

|  | Sample No. | | | | |
| --- | --- | --- | --- | --- | --- |
|  | 1 | 2 | 3 | 4 | 7 |
| Cured 30 Minutes at 307° F.: | | | | | |
| Ultimate tensile, p.s.i | 2,610 | 2,630 | 3,170 | 3,120 | 2,290 |
| Ultimate elongation, percent | 610 | 720 | 770 | 670 | 880 |
| Hardness, Shore A | 60 | 57 | 58 | 64 | 57 |
| Modulus, 300% | 1,160 | 790 | 760 | 1,040 | 540 |
| Air Oven Aged, 70 hrs. at 212° F., Cured 30 min. at 307° F.: | | | | | |
| Ultimate tensile, p.s.i | 2,166 | 2,388 | 3,122 | 2,666 | 2,578 |
| Ultimate elongation, percent | 350 | 340 | 530 | 420 | 430 |
| Hardness, Shore A | 71 | 67 | 68 | 73 | 68 |
| Compression Set, ASTM Method B 70 hrs. at 212° F.: percent Set | 41.5 | 40.8 | 48.2 | 45.0 | 69.2 |
| Oil Resistance (Cured 30 min. at 307° F.): | | | | | |
| ASTM #3 oil, 70 hrs. at 212° F., Percent Volume Change | 13.7 | 19.7 | 23.4 | 18.9 | 20.4 |
| ASTM Fuel B, 70 hrs. at Room Temp., Percent Volume Change | 28.8 | 37.0 | 35.6 | 31.7 | 30.5 |

The lattices of the copolymers of samples 1 to 5, inclusive were coagulated with salt in acidified solution as in Example I, and sample solutions of each of the washed and dried samples were prepared by dissolving 40 grams of copolymer in 200 grams of toluene. Mixtures of each of the commercial nitrile rubbers in toluene were prepared at solids contents of 40 grams per 200 grams of toluene. The viscosity measurements recorded above were made by the Zahn cup method on all samples.

The toluene solutions of the terpolymers of the invention were far more fluid and had much lower viscosities in all cases than the toluene mixtures of the commercial NBR rubbers which were very thick, semi-solid gelatinous masses.

One of the advantages of the copolymers of the invention is that they can be processed and cured by the same procedures used with conventional butadiene-nitrile (NBR) rubbers. The physical properties developed in the copolymers of the invention as reinforced vulcanizates As may be seen from the foregoing data those terpolymers of the invention (samples 2 and 4) closest to the commercial copolymer in butadiene-acrylonitrile proportions had very comparable physical properties. Their oil resistance was equally as good, yet they formed fluid solutions of low viscosity in toluene while the commercial polymers gave thick gelatinous mixtures. The physical properties of the terpolymers with lower butadiene and higher vinyl monomer contents were higher than the commercial NBR rubbers as might be expected.

The copolymer of Example I (sample 3 of Table I) was compared with several different commercial butadiene-acrylonitrile copolymers by mixing 40 grams of each uncured copolymer with equal 200 gram quantities of toluene. Viscosities of the solutions or mixtures were measured by the Brookfield method with a #3 spindle at two different speeds and the results are shown below in Table III.

TABLE III

| Viscosity, Centipoises | Commercial Rubber | | | | | Sample 3 |
| --- | --- | --- | --- | --- | --- | --- |
| | A | B | C | D | E | |
| Brookfield #3 Spindle: | | | | | | |
| 6 r.p.m. | (¹) | 4,800 | 1,300 | (¹) | 11,300 | 300 |
| 12 r.p.m. | (¹) | 3,900 | 1,250 | (¹) | 8,500 | 450 |

¹ Too thick, no readings.

As clearly seen from the above, the invention provides rubbery nitrile copolymers which are toluene soluble and which provide cements of workable fluidity and of much lower viscosity in aromatic hydrocarbons than conventional nitrile (NBR) rubbers. Advantageously, the oil resistance typical of nitrile rubbers is retained in the cured copolymers of the invention.

*Example III*

This example illustrates the affect of the modifier level or content in preparing the copolymers suitable for the purpose of this invention. Polymerizations of several copolymers are conducted using monomers and recipes identical to that described in Example I with the exception that the copolymers are prepared in systems containing .01, 0.2, 0.8 and 1.0 part of tertiary dodecyl mercaptan. In all polymerizations the reactions are short-stopped at about 70% conversion in the manner described in Example I.

Twenty gram samples of each of the dried copolymers are admixed with 100 grams of toluene and evaluated for their suitability for obtaining the results of the invention. The mixtures of the copolymers prepared with less than 0.25 part of the mercaptan give thick, gel-like masses that are much too viscous for the purposes of this invention. On the other hand, the copolymers prepared using more than 0.75 part of the modifier are readily dissolved in the toluene. However, the copolymers are semi-solid extremely soft polymeric materials which are difficult to process and which do not possess the adhesive properties necessary for producing the rubber cements of this invention.

Various alkenyl aromatic monomers may be used in place of styrene and such monomers may be either carbocyclic or heterocyclic as long as they contain a monoethylenically unsaturated substituent on the ring which makes them copolymerizable with the diene and the nitrile. In general the ethylenically unsaturated substituent must contain at least one carbon to carbon double bond activated by association with a terminal methylene group, such as in vinyl $CH_2=CH-$ or vinylidene $CH_2=CH<$ radicals, or activated by a strongly polar group such as $R-CH=C<$ where R is a carboxyl, carboxylic ester, halogen, keto, cyano, sulfo, or other polar grouping. For example, alphamethylstyrene, vinyl toluene and various other alkyl substituted styrenes, vinyl naphthalene, vinyl furane, vinyl carbazole, and vinyl pyridines are among those which may be mentioned as suitable aromatic monomers.

Acrylonitrile is the preferred nitrile monomer in most instances, but other aliphatic acrylic nitriles such as methacrylonitrile and ethacrylonitrile may be employed for obtaining the characteristic oil resistance in the cured rubber. In commercial practice a range of 20 to 30 parts of the nitrile per hundred of monomer is preferred within the broader range given above.

Although various other conjugated diolefins may be used in place of butadiene, for example, isoprene, piperylene, methylpentadiene, 2,3-dimethyl-1,3-butadiene and other dienes containing from 4 to 6 carbon atoms per molecule, it is preferred to utilize butadiene because of the availability, economy, and better copolymer properties developed with this diene.

The copolymers of the invention may be multipolymers containing one or more of each of the essential monomers, i.e., the diolefin, nitrile and alkenyl aromatic monomer. Also, other comonomers may be employed in small quantities which do not detract from the desired properties. Among these may be mentioned esters of acrylic acids and saturated fatty alcohols, and unsaturated acids and amides, such as methyl methacrylate, acrylic acid, and acrylamide.

As shown in the exmples above, the polymerization of the copolymers of the invention is accomplished by conventional aqueous emulsion polymerization. Suitable catalysts or initiators for the copolymerization include inorganic peroxy salts, such as alkali metal persulfates, percarbonates, perborates, hydrogen peroxide and the like. In addition, if the polymerization is to be conducted at low temperatures, the conventional redox initiation systems using various organic hydroperoxides such as diisopropyl hydroperoxide with iron pyrophosphates or polyalkylene polyamines are suitable.

Suitable emulsifiers for the aqueous emulsion polymerization include alkali metal or ammonium salts of alkyl aryl sulfonates, sulfates of long chain aliphatic alcohols, alkali metal and ammonium salts of long chain fatty acids, such as sodium oleate, sodium stearate, sodium laurate, etc., and similar salts of rosin acids and polymerized rosin acids, and also conventional non-ionic emulsifying agents.

In all cases the polymerizations are terminated below the gel point of the copolymer by the use of conventional short-stopping agents such as hydroxyl ammonium sulfate, hydroquinone, and alkylated polyhydroxy phenols, so that the toluene soluble copolymers are gel free. The degree of conversion will vary with the monomer system and to some extent with the modifier level. In general, the higher the modifier level, the higher the degree of conversion permissible while retaining gel free structure in the copolymers. Thus, it has been found that the modifier used in the polymerization system must be in a range from about 0.25 to about 0.75 and preferably from about 0.35 to about 0.5 part per 100 parts of the monomers charged. It will be appreciated that within the preferred modifier range the resulting copolymers are particularly suitable for preparing the rubber cements of this invention and that polymerizations effected on the lower side of the preferred range tend to form harder and tougher copolymers, whereas polymerizations on the higher side cause formation of softer copolymers.

Suitable modifiers for the purpose of this invention include the conventional mercaptans such as the primary, secondary and tertiary alkyl mercaptans containing from 10 to 22 carbon atoms, the xanthogens such as isopropyl xanthogen, thiophenols, and the like. Because the alkyl mercaptans are particularly effective and efficient in emulsion polymerizations, they are the preferred modifiers.

The term "fluid viscosity" as used herein and in the claims means that solutions of 20 grams of copolymer per 100 grams of toluene or equivalent concentrations provide #3 Zahn cup viscosities of about 100 seconds or less, or equivalent Brookfield viscosities (#3 spindle, 6 r.p.m.).

The terms "oil resistant" and "oil resistance" refer to the property of substantial retainment of the original volume of the cured copolymer, i.e., a relatively low degree of swelling in substances composed of a major portion of aliphatic hydrocarbons. This property is measured by the "B" Fuel and #3 Oil tests set forth above.

The test methods used in obtaining the data reported herein are in accordance with the procedures given in ASTM Standards on Rubber Products. Percentages or parts are given by weight except where otherwise indicated.

Various other substitutions and modifications may be made in the practice of the invention which will be apparent to those skilled in the art and which therefore are within the scope of the invention as defined in the appended claims.

What is claimed is:

1. An oil resistant nitrile rubber comprising a multipolymer made from a monomer mixture consisting essentially of 40 to 70% of a conjugated diolefin of 4 to 6 carbon atoms, 20 to 40% of an aliphatic acrylic nitrile, and 10 to 40% of an alkenyl aromatic monomer, said copolymer being emulsion polymerized to a gel-free state at a monomer conversion not substantially exceeding 80% in a system containing from 0.25 to 0.75 part of a mercaptan chain transfer agent per 100 parts of monomer, and characterized by solutions of fluid viscosity in aromatic hydrocarbon solvents.

2. The rubber of claim 1 in which said multipolymer consists essentially of 40 to 70% butadiene, 20 to 40% acrylonitrile and 10 to 40% of an alkenyl aromatic monomer, said copolymer being characterized as forming solutions of fluid viscosity in toluene at a copolymer solids content of 20 grams per 100 grams of toluene, and further characterized in the cured state by oil resistance comparable to butadiene-acrylonitrile copolymers devoid of said aromatic monomer.

3. The rubber of claim 2 in which the alkenyl aromatic monomer is styrene.

4. The rubber of claim 3 in which said multipolymer is made from a monomer mixture containing 50% butadiene, 30% acrylonitrile, and 20% styrene.

5. A rubber cement comprising a rubbery copolymer made from a monomer mixture of 40 to 70% of a conjugated diolefin having 4 to 6 carbon atoms, 20 to 40% of an aliphatic acrylic nitrile and 10 to 40% of an alkenyl aromatic monomer by emulsion polymerization to a gel-free state at a monomer conversion not substantially exceeding 80% in a system containing from 0.25 to 0.75 part of a mercaptan chain transfer agent per 100 parts of monomer, said copolymer being dissolved in an aromatic hydrocarbon solvent and characterized by a fluid viscosity.

6. The rubber cement of claim 5 in which said copolymer is dissolved in toluene and characterized by a fluid viscosity at a copolymer solids content of 20 grams per 100 grams of toluene, the rubber of said cement when cured exhibiting an oil resistance comparable to that of butadiene-acrylonitrile rubber devoid of said aromatic monomer.

7. The rubber cement of claim 6 in which the alkenyl aromatic monomer is styrene.

8. The rubber cement of claim 6 in which said copolymer contains from 20 to 30% acrylonitrile.

9. The rubber cement of claim 7 in which said copolymer is made from a monomer mixture of 50% butadiene, 30% acrylonitrile and 20% styrene.

References Cited

UNITED STATES PATENTS

| 2,384,543 | 9/1945 | Fryling | 260—84.5 |
| 2,901,448 | 8/1959 | Kraus | 260—5 |
| 3,234,302 | 2/1966 | Wacome | 260—880 |

OTHER REFERENCES

Morton: Rubber Technology, Reinhold, New York, 1959, page 272.

MORRIS LIEBMAN, *Primary Examiner.*

J. S. WALDRON, S. L. FOX, *Assistant Examiners.*